US006761305B1

(12) United States Patent
Kehl

(10) Patent No.: US 6,761,305 B1
(45) Date of Patent: Jul. 13, 2004

(54) SELF-CONTAINED HONEYCOMB STRUCTURE FROM FLEXIBLE FILM STRIPS AND METHOD FOR ITS PRODUCTION

(75) Inventor: Achim Kehl, Leopoldshöhe (DE)

(73) Assignee: Tokyo Kikai Seisakusho, Ltd., Tokyo (JP)

( * ) Notice: Subject to any disclaimer, the term of this patent is extended or adjusted under 35 U.S.C. 154(b) by 0 days.

(21) Appl. No.: 10/031,964

(22) PCT Filed: Jun. 20, 2000

(86) PCT No.: PCT/DE00/01949

§ 371 (c)(1), (2), (4) Date: Jan. 17, 2002

(87) PCT Pub. No.: WO01/00397

PCT Pub. Date: Jan. 4, 2001

(30) Foreign Application Priority Data

Jun. 23, 1999 (DE) .................................. 199 28 712

(51) Int. Cl.[7] ............................ B23K 31/02; B23K 37/04
(52) U.S. Cl. ........................ 228/181; 228/49.1; 228/49.4
(58) Field of Search ............................... 228/47.1, 49.1, 228/49.4, 181, 183

(56) References Cited

U.S. PATENT DOCUMENTS 5,437,936 A * 8/1995 Johnson ..................... 428/593

5,635,306 A * 6/1997 Minamida et al. .......... 428/593

FOREIGN PATENT DOCUMENTS

| DE | 197 03 961 | * | 8/1998 | ............. B32B/3/28 |
| DE | 197 03 961 A1 | * | 8/1998 | ............. B32B/3/28 |
| FR | 1 518 581 | * | 7/1968 | |
| GB | 1 381 670 | * | 1/1975 | ............. F16S/5/00 |

* cited by examiner

*Primary Examiner*—Tom Dunn
*Assistant Examiner*—Kevin P. Kerns
(74) *Attorney, Agent, or Firm*—McGlew and Tuttle, P.C.

(57) ABSTRACT

A honeycomb structure with a plurality of flexible material strips which are arranged next to one another and are connected to one another is presented. The material strips have a corrugated shape with U-shaped cross section of essentially straight, vertical partial areas (3) and curved, horizontal partial areas (2). The material strips are connected to one another at contact points (4) of the straight, vertical partial areas. In addition, a device for manufacturing a honeycomb has welding sections (6). The flexible material strips (9) are guided by the welding sections (6), where the material strips are welded to one another by means of a comb-like finger system (10). The finger system or the welding sections are laterally displaced by two sections and by a pressing operation taking place between the finger and the welding section. This presses two material strips onto a heated welding wire (7), which leads to the thermal connection of the material strips.

8 Claims, 2 Drawing Sheets

SELF-CONTAINED HONEYCOMB STRUCTURE FROM FLEXIBLE FILM STRIPS AND METHOD FOR ITS PRODUCTION

FIELD OF THE INVENTION

The present invention pertains to a honeycomb structure from flexible material strips, which are connected to one another, so that a self-supporting honeycomb structure is formed, as well as to a process for manufacturing same.

BACKGROUND OF THE INVENTION

Corresponding honeycomb structures are used, among other things, as transparent or opaque heat insulation, as filler material for partitions or as the core material in the manufacture of sandwich boards.

If the honeycombs are used as heat insulation, low density is important in order to obtain good insulation values. If the honeycombs shall be used for sandwich boards, high compressive strength combined with high shear strength is necessary.

Similar honeycomb structures are described in the Auslegeschrift DT2231959 B2 and in the Offenlegungsschrift DE 197 03 961 A1.

The Auslegeschrift DT 2231959 B2 describes a honeycomb from corrugated, rigid strips, which have an inherent stability, so that they can be stacked upon one another, and form a self-supporting structure, without the strips being welded or bonded to one another. The prerequisite for this is that die arches of the corrugations have such an arrangement that the shortest free distance between two adjacent peaks of the corrugation in each strip is smaller than the greatest free width of the valley of the corrugation (therefore, the corrugated strips cannot he pushed into one another).

Honeycombs of this type cannot be manufactured from flexible material strips, because a flexible strip cannot be bent into a rigid corrugated shape.

Honeycombs of this type are used as the core for sandwich boards made of metal, e.g., in the manufacture of aircraft.

A honeycomb structure made of flexible film strips is described in the Offenlegungsschrift DE 197 03 961 A 1, wherein the film strips are welded onto one another in the corrugated form, so that a self-supporting honeycomb is formed. The principal difference from DT 2231959 B2 is that flexible strips are used here and a honeycomb is generated only when the strips arc connected lo one another by welding or bonding in the transition area from the horizontal and vertical partial areas of the corrugated strips arranged one on top of another. The residual stress (restoring behavior) of the flexible strips ensures that the honeycomb is more rigid and stable than a honeycomb made of pre-corrugated webs. A honeycomb is formed which is similarly bulged as the honeycomb from DT 2231959 B2 and has a nearly isotropic behavior whether it is loaded mechanically in the vertical or horizontal direction. One drawback is that this honeycomb cannot be compressed without distortions developing in the structure. Another drawback of this honeycomb which is linked with the process is the optically nonuniform edge structure. Since individual film strips are welded to one another, the overhanging film strips overlap at the lateral edges in parallel to the direction of production. To obtain a clean edge closure, an edge strip must be cut off, as a result of which drawbacks arise in terms of costs due to clipping.

SUMMARY AND OBJECTS OF THE INVENTION

The basic object of the present invention is to improve a honeycomb of the type mentioned in the introduction such that a self-supporting honeycomb is formed from flexible strips, which has a clean edge structure and can be compressed in a direction in parallel to the direction of production.

According to the present invention a self-supporting honeycomb is provided manufactured from flexible strips, which honeycomb consists, however, contrary to DE 197 03 961 A1, of horizontal, bent partial areas arranged at right angles to one another in parallel to the directional of production and straight vertical partial areas.

In addition, the bonded or weld scam of the honeycomb being described here is located at straight vertical partial areas rather than of the horizontal and vertical partial areas of the corrugated strips arranged one on top of another (or in other words, at the edges of the parallelepipedic cavities), as in DE 197 03 961.

These features, which are essential for the present invention, are characteristic of a compressible honeycomb, and the advantage is above all that a compressed honeycomb can be transported at a substantially lower cost. Moreover, there are applications, e.g., as heat insulation, which require a small hole diameter, which can be obtained simply by compressing the honeycomb. Minimization of the hole diameter means a maximization of the heat insulation factor (k value) for a honeycomb.

The honeycomb displays different behaviors under mechanical loading in the horizontal and vertical directions. Compression in parallel to the direction of production is possible without the structure of the honeycomb being distorted. A clean edge is formed on both sides of the honeycomb along the direction of production, because the respective outer film is welded endlessly to the honeycomb.

According to another aspect of the invention, a device is provided with which a self-supporting honeycomb structure can be manufactured.

The device has a welding head, which comprises a plurality of welding sections or webs arranged in parallel to and at uniformly spaced locations from one another, all of which are equipped with a welding wire on the front side. Flat feed elements, which can be displaced forward and backward in parallel to the webs, are in contact with the lateral surfaces of the welding webs. There is a small gap between the feed elements, through which the film strips can be guided. In addition, the device has a comb with individual fingers, which can be moved into and withdrawn from the honeycomb structure in front of the welding webs. The welding head and the finger comb are displaceable in parallel to one another.

In addition, the welding head and the finger comb can be pressed against one another.

The necessary U-shaped corrugated structure of the film strips is produced with the device by the lateral displacement of the welding head and the comb, and the film strips are subsequently welded to one another at the vertical partial areas.

Not only plastic films, but all types of flexible material strips can be connected to one another with the device, the only requirement being the weldability of the material.

The honeycomb structure according to the present invention as well as the process steps for manufacturing this honeycomb structure will be explained in greater detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
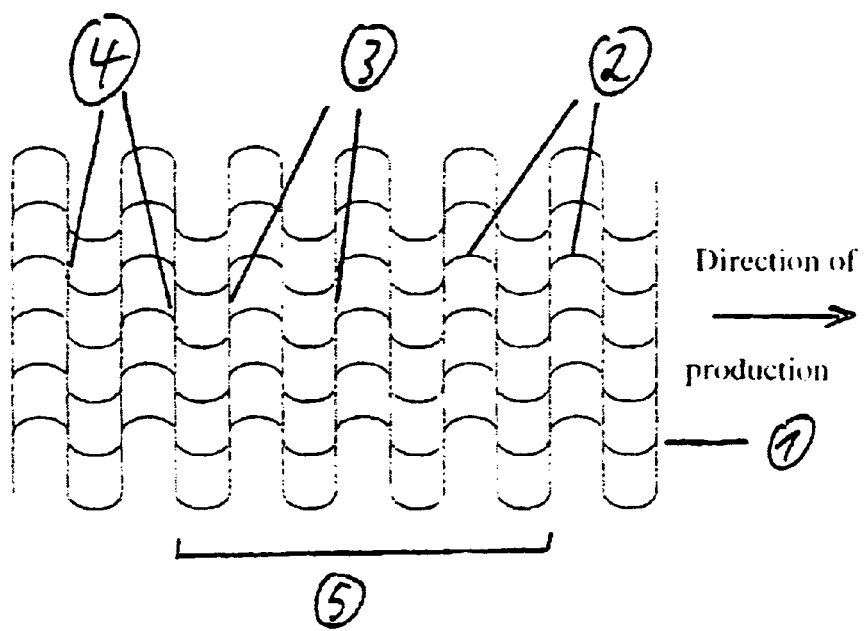
FIG. 1 is a top view of a honeycomb structure according to the present invention.

FIG. 1 shows honeycomb structure according to the present invention. The connection of the individual film webs, to the points designated by 4, is possible by bonding or, as was described above, by preparing a weld seam extending at right angles to the film web. The honeycomb structure is in general designated by reference number 1 with a horizontal partial area 2 of the structure. Vertical partial areas 3 and welded connection points or lines are shown in FIG. 1. A clean corrugated edge structure 5 results as there is no waste material generated along the edges.

FIGS. 2 to 8 show the device for manufacturing the honeycomb structure according to FIG. 1. An example according to the present invention will be described below. The example includes individual process step for manufacturing a honeycomb structure with film webs using welded connections.

Figure 2:
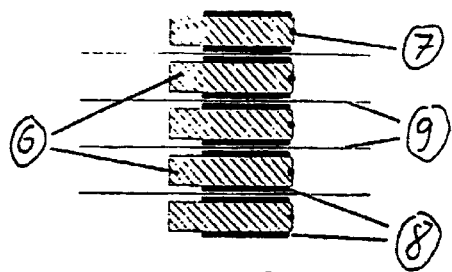
FIG. 2 is top view of the device for manufacturing the honeycomb structure according to FIG. 1 showing an individual process step.

FIG. 2 shows the welding head with the welding webs 6, which are equipped with welding wires 7 on the front side, and with the flat feed elements 8, which are in contact with the welding webs.

The welding head is located in the starting position, and the individual film strips 9 are inserted between the narrow gaps of the feed elements.

Figure 3:
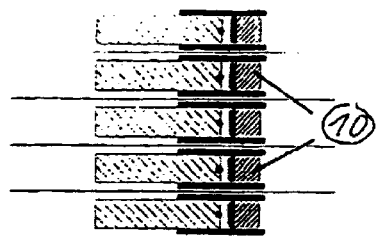
FIG. 3 is top view of the device for manufacturing the honeycomb structure according to FIG. 1 showing another process step.

FIG. 3 shows the first processing step. The feed elements 8 move forward until they project from the welding head over a certain distance. The finger comb 10 now moves between the feed elements and thus into the film strip until it stands in front of the welding head over the full welding height.

Figure 4:
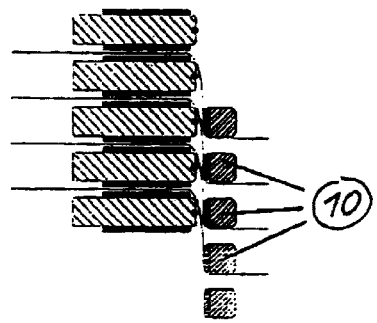
FIG. 4 is top view of the device for manufacturing the honeycomb structure according to FIG. 1 showing another process step.
Figure 5:
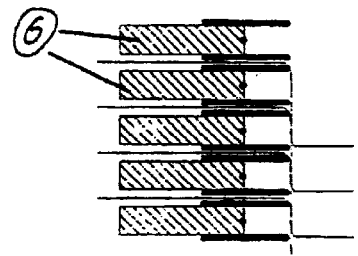
FIG. 5 is top view of the device for manufacturing the honeycomb structure according to FIG. 1 showing another process step.

The feed elements 8 move back again behind the welding plane corresponding to FIG. 4. The welding head and the finger comb 10 are now displaced in parallel horizontally by an amount or distance 14 corresponding to twice the distance between two welding spots. The first welding of the film takes place in this position, the welding head and the welding fingers being pressed onto one another as indicated by arrow 15. The welding wires 11 contact and thermally weld the film pressed thereon by the flexible welding pads 12. It is also possible to equip the fingers with heating wires together designated 13, so that heat may be applied from one or more sides of the film.

According to FIG. 5 the fingers 10 again move out of the film strip 9. The feed elements 8 then move forward and the film structure welded together is fed. The welding head again moves back into the starting position by an amount corresponding to twice the space between two welding spots.

Figure 6:
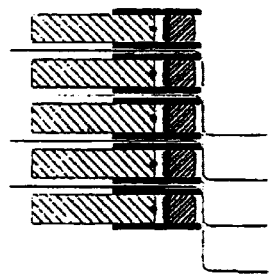
FIG. 6 is top view of the device for manufacturing the honeycomb structure according to FIG. 1 showing another process step.
Figure 7:
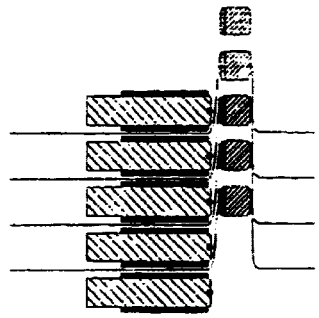
FIG. 7 is top view of the device for manufacturing the honeycomb structure according to FIG. 1 showing another process step.

The fingers 10 then move again into the film structure corresponding to FIG. 6. FIG. 7 shows how the feed elements 8 move back behind the welding plane.

The welding head and the fingers 10 are now displaced in opposite directions. Pressing on of the welding head with the fingers 10 and the film welding operation will again take place.

Figure 8:
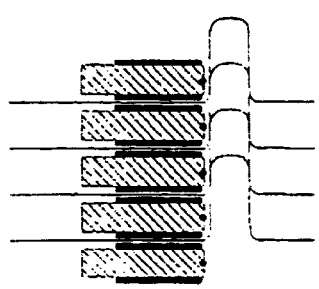
FIG. 8 is top view of the device for manufacturing the honeycomb structure according to FIG. 1 showing still another process step.

The fingers 10 then move again out of the film structure according to FIG. 8 and the cycle of steps begins anew with step 1 (FIG. 3).

While a specific embodiment of the invention has been shown and described in detail to illustrate the application of the principles of the invention, it will be understood that the invention may be embodied otherwise without departing from such principles.

What is claimed is:

1. A device for manufacturing a honeycomb structure with a plurality of flexible material strips arranged next to one another, the strips being connected to one another, the material strips having a corrugated shape with a U-shaped cross section of essentially straight vertical partial areas and curved horizontal partial areas, the material strips being connected to one another at contact lines of the straight vertical partial areas, the device comprising:

laterally disconnected welding sections equipped with heated welding wires, by which said flexible material strips;

are guided, said material strips being welded to one another by means of a comb-like finger system, moveable into the material strips to generate a welding surface, and to fold the material strips to a honeycomb structure by a lateral displacement of either the finger system or the welding sections and to perform a pressing-on motion by either the finger system or the welding sections, to press two material strips onto a heated welding wire, thermally connecting the material strips; and feed elements generating a feed motion of the honeycomb by a distance of one honeycomb hole diameter whenever a welding cycle of one honeycomb layer is performed after the finger system has moved out of the honeycomb layer after the welding of the material strips is finished, and the finger system or the welding sections being laterally displaced by;

a distance corresponding to twice the distance between two welding spots and wherein the finger system or the welding sections perform a lateral displacement by the same distance during the first welding cycle in one direction and during the following welding cycle in the opposite direction.

2. A device in accordance with claim 1, wherein said fingers of are equipped with a heating wire for welding together the material strips.

3. A device in accordance with claim 1, wherein both said welding sections and said fingers are equipped with a heating wire for welding together the material strips.

4. A device in accordance with claim 1, wherein the feeding of the honeycomb can be accomplished by means of said feed elements between said welding sections, but also with a second finger system which moves into the completely welded honeycomb and subsequently performs a feed motion.

5. A device for manufacturing a honeycomb structure in accordance with claim 1, further comprising:

flexible welding pads on fingers of said finger system.

6. A device for manufacturing a honeycomb structure with a plurality of flexible material strips arranged next to one another, the strips being connected to one another, the material strips having a corrugated shape with a U-shaped cross section of essentially straight vertical partial areas and curved horizontal partial areas, the material strips being connected to one another at contact lines of the straight vertical partial areas, the device comprising:

welding sections arranged spaced relative to each other, said material strips being feedable between said welding sections by feed elements; and a finger system corresponding to said welding sections, said finger system being laterally displaceable relative to said welding sections displacing said material strips after feeding by said feed elements, to form U-shaped sections, subsequent to said lateral displacing of said material strips, said finger system pressing said material strips against said welding sections between a heating wire on one or both of said welding sections and said finger system to form a thermal weld between two of said material strips, said finger system then retracting from between said material strips, moving in a lateral direction opposite to that of the last lateral displacement, inserting between said material strips displaced by two welding sections, and repeating said steps but with a displacement in an opposite lateral direction beginning with said feed elements feeding said material strips.

7. A device for manufacturing a honeycomb structure in accordance with claim 6, further comprising:

flexible welding pads on said fingers of said finger system.

8. A method of forming a U-shaped honeycomb structure from a plurality of material strips, the method comprising:

a) feeding material strips by means of feed elements between welding sections;

b) inserting fingers of a finger system, with said fingers corresponding to said welding sections, between said material strips and laterally displacing said fingers with said material strips by two welding sections relative to said welding sections;

c) moving said finger system against said welding sections pressing two layers of said material strips together between one or more of said welding sections and said fingers;

(d) heating said layers of material strips pressed together to form a thermal weld;

e) withdrawing said fingers from between said material strips; and f) continuing to perform steps a–e, while alternating the lateral displacement direction in step b each time it is performed, until a desired amount of honeycomb structure is produced.

* * * * *